United States Patent
Schaafsma et al.

(10) Patent No.: US 12,006,751 B2
(45) Date of Patent: Jun. 11, 2024

(54) ARTICULATING VEHICLE ENERGY SOURCE DOOR

(71) Applicant: ILLINOIS TOOL WORKS INC., Glenview, IL (US)

(72) Inventors: Christopher Thomas Schaafsma, Wheaton, IL (US); Saman Bagheri Farahani, Northbrook, IL (US); Justin Louis Ruzich, Frankfort, IL (US); Dennis Matthew Mark, Buffalo Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 344 days.

(21) Appl. No.: 17/610,214

(22) PCT Filed: May 5, 2020

(86) PCT No.: PCT/US2020/031469
§ 371 (c)(1),
(2) Date: Nov. 10, 2021

(87) PCT Pub. No.: WO2020/231675
PCT Pub. Date: Nov. 19, 2020

(65) Prior Publication Data
US 2022/0251891 A1     Aug. 11, 2022

Related U.S. Application Data

(60) Provisional application No. 62/857,533, filed on Jun. 5, 2019, provisional application No. 62/847,421, filed on May 14, 2019.

(51) Int. Cl.
*B60K 15/05* (2006.01)
*E05D 3/16* (2006.01)
*E05D 11/06* (2006.01)

(52) U.S. Cl.
CPC ............... *E05D 3/16* (2013.01); *B60K 15/05* (2013.01); *E05D 11/06* (2013.01); *B60K 2015/0561* (2013.01); *E05Y 2900/132* (2013.01)

(58) Field of Classification Search
CPC ........... E05D 3/16; E05D 11/06; E05D 3/122; E05D 11/1007; B60K 15/05;
(Continued)

(56) References Cited

U.S. PATENT DOCUMENTS

| 4,776,486 A | * | 10/1988 | Mizusawa | B60K 15/0406 220/817 |
| 5,520,431 A | | 5/1996 | Kapes et al. | |

(Continued)

FOREIGN PATENT DOCUMENTS

| CN | 201777122 U | 3/2011 |
| CN | 205686169 U | 11/2016 |

(Continued)

OTHER PUBLICATIONS

CN 202080034315.1 Office Action, dated Oct. 13, 2023, 11 pages.
International Search Report and Written Opinion for PCT/US2020/031469, mailed Sep. 4, 2020 (13 pages).

*Primary Examiner* — Pinel E Romain
(74) *Attorney, Agent, or Firm* — Quarles & Brady LLP

(57) ABSTRACT

A vehicle port door includes a housing and an interlocking linkage assembly. The interlocking linkage assembly is pivotably connected to the housing.

18 Claims, 20 Drawing Sheets

(58) Field of Classification Search
CPC .... B60K 2015/0561; B60K 2015/0523; B60K 2015/053; E05Y 2900/132; E05Y 2900/534; B60Y 2410/113
USPC .......................................... 296/146.11, 97.22
See application file for complete search history.

(56) References Cited

U.S. PATENT DOCUMENTS

| | | | | |
|---|---|---|---|---|
| 5,658,036 | A * | 8/1997 | Benoist | B60K 15/05 |
| | | | | 296/97.22 |
| 5,676,416 | A | 10/1997 | Cooper | |
| 5,906,405 | A | 5/1999 | Cooper | |
| 6,234,555 | B1 * | 5/2001 | Emmerich | B60K 15/05 |
| | | | | 296/97.22 |
| 9,656,561 | B2 * | 5/2017 | Yoo | B60L 53/16 |
| 2004/0049987 | A1 | 3/2004 | Hirano | |
| 2005/0257852 | A1 | 11/2005 | Ropert et al. | |
| 2007/0096503 | A1 * | 5/2007 | Borleis | E05D 3/127 |
| | | | | 296/146.11 |
| 2008/0258552 | A1 | 10/2008 | Tseng et al. | |
| 2009/0045646 | A1 | 2/2009 | Scott et al. | |
| 2011/0140477 | A1 | 6/2011 | Mihai | |
| 2011/0285165 | A1 * | 11/2011 | Baba | B60K 15/05 |
| | | | | 296/97.22 |
| 2011/0285166 | A1 * | 11/2011 | Baba | E05D 11/1007 |
| | | | | 296/97.22 |
| 2012/0047807 | A1 | 3/2012 | Lee et al. | |
| 2014/0215761 | A1 | 8/2014 | Zetti | |
| 2014/0239646 | A1 | 8/2014 | Betzen et al. | |
| 2015/0151645 | A1 | 6/2015 | Yamamaru | |
| 2015/0291024 | A1 | 10/2015 | Betzen et al. | |
| 2016/0087375 | A1 | 3/2016 | Yoshizawa et al. | |
| 2016/0121746 | A1 * | 5/2016 | Takahashi | E05D 3/06 |
| | | | | 49/242 |
| 2017/0368928 | A1 | 12/2017 | Mori et al. | |
| 2019/0118644 | A1 | 4/2019 | Beck | |

FOREIGN PATENT DOCUMENTS

| | | |
|---|---|---|
| CN | 106255793 A | 3/2019 |
| DE | 10064133 A1 | 3/2008 |
| DE | 102008024584 A1 | 11/2009 |
| DE | 102012018900 B3 | 7/2013 |
| DE | 202016105735 U1 | 10/2016 |
| DE | 102016014726 A1 | 6/2017 |
| DE | 102016107094 A1 | 10/2017 |
| DE | 102017104514 A1 | 3/2018 |
| JP | 2011080301 | 4/2011 |
| KR | 20060060859 A | 6/2006 |
| KR | 20060096614 A | 9/2006 |
| KR | 20130065108 A | 6/2013 |

* cited by examiner

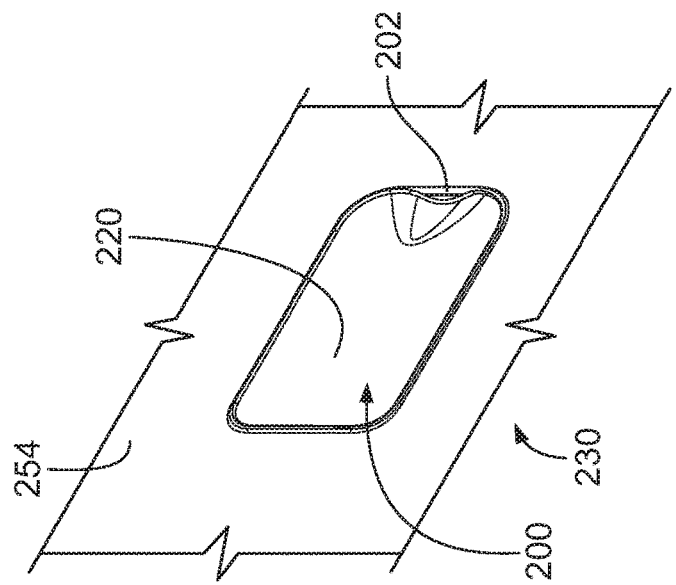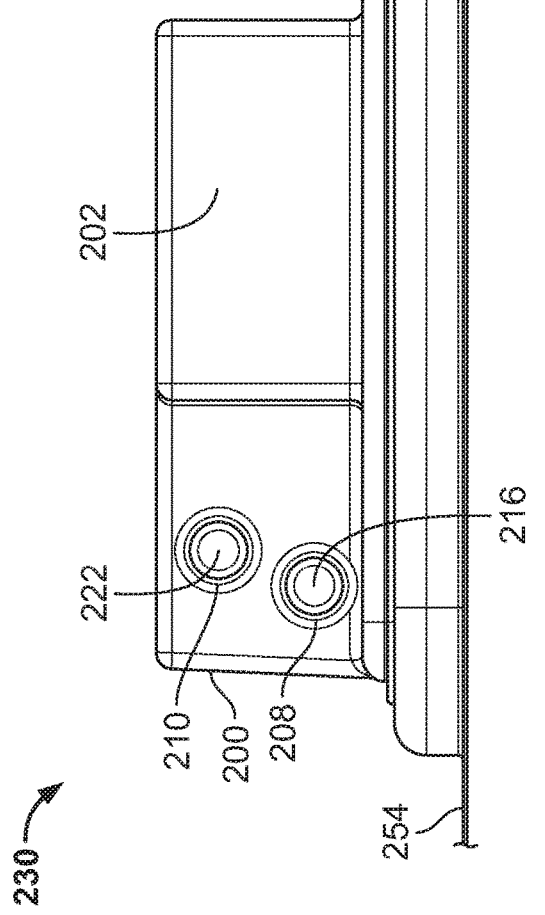

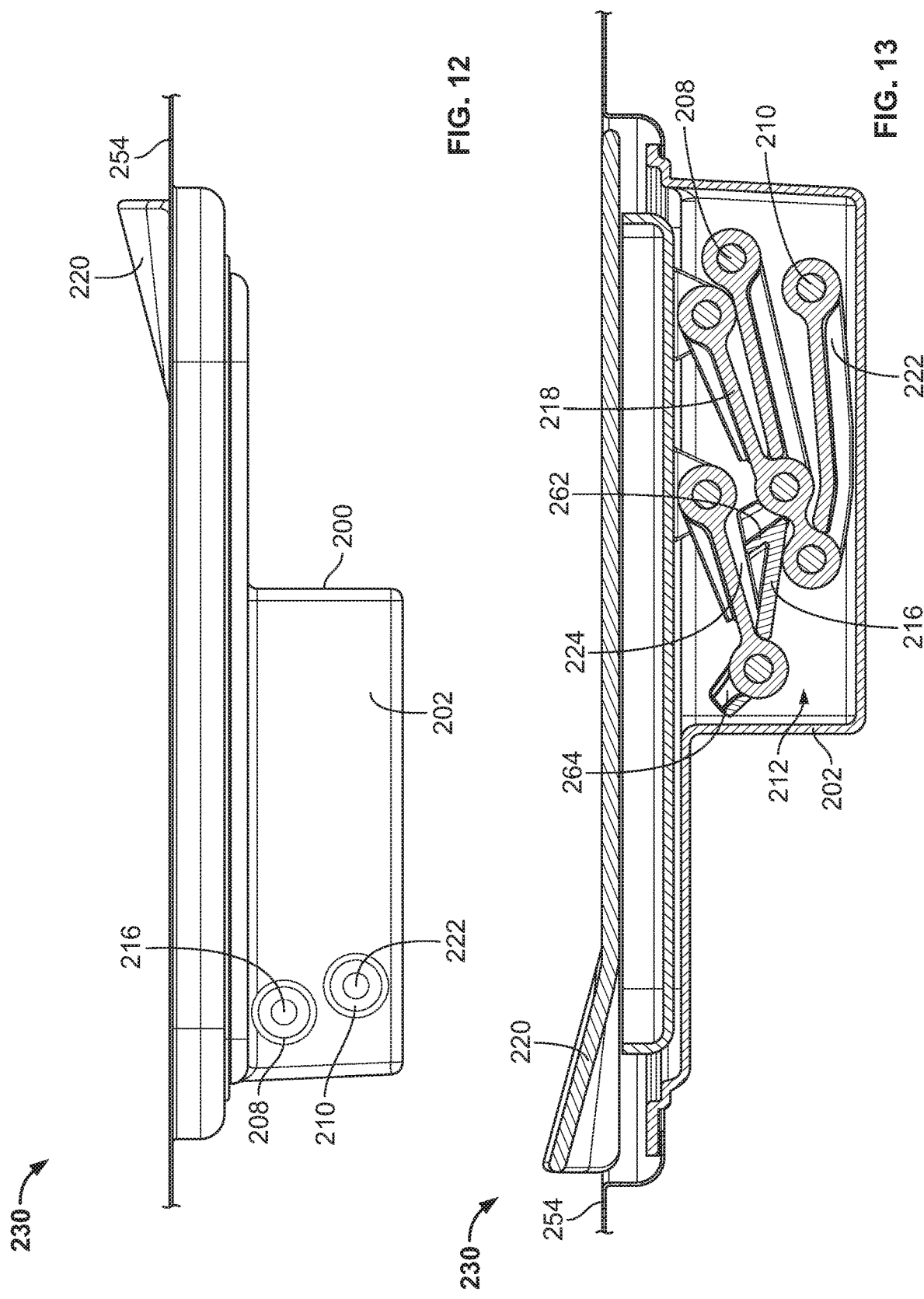

ate position;

ARTICULATING VEHICLE ENERGY SOURCE DOOR

RELATED APPLICATIONS

The present application represents the United States National Stage of International Application No. PCT/US2020/031469, filed May 5, 2020, which claims priority to U.S. Provisional Patent Ser. No. 62/857,533, filed on Jun. 5, 2019 and U.S. Provisional Application Ser. No. 62/847,421, filed on May 14, 2019, which are incorporated by reference in their entireties herein.

FIELD OF THE DISCLOSURE

Embodiments of the present disclosure generally relate to vehicle port covers, and, more particularly, to an articulating vehicle energy source door.

BACKGROUND

In recent years, covers have been developed to secure and shield ports connected to vehicle energy sources. For example, internal combustion driven vehicles include hinged doors and housings to cover a refueling port of the vehicle. As another example, electric vehicles include hinged doors and housings to cover a recharging port of the vehicle. These hinged doors keep the vehicle energy source ports clean, may improve aerodynamics of the vehicle, and generally improve the appearance of the vehicle.

Certain known vehicle energy source doors use a gooseneck-hinged door design to ensure the door clears a body of the vehicle when the door is in an open position.

Vehicle manufacturers often locate the vehicle energy source port in portions of the vehicle that have little available space behind the body. However, the known gooseneck-hinged doors protrude inwardly behind the body. Further, installation of a gooseneck-hinged door assembly requires rotating the assembly into position before snap fitting the assembly into the body.

Therefore, a need exists for a vehicle energy source door that protrudes minimally behind a vehicle body, resists downward deflection (e.g., from a driver's hand), and reduces installation complexity.

SUMMARY

In one aspect, an example vehicle energy source port door includes a housing and an interlocking linkage assembly. The interlocking linkage assembly is pivotably connected to the housing.

BRIEF DESCRIPTION OF THE DRAWINGS

FIG. 7 is an isometric view of the second example vehicle energy source port door of FIGS. 4-6 installed in a body panel of a vehicle;

FIG. 8 is a top view of the second example vehicle energy source port door of FIGS. 4-7 installed in the body panel of FIG. 7;

FIG. 12 is a bottom view of the second example vehicle energy source port door of FIGS. 4-11 installed in the body panel of FIGS. 7-11;

FIG. 13 is a cross-sectional view of the second example vehicle energy source port door of FIGS. 4-12 installed in the body panel of FIGS. 7-12 taken along line 13-13 of FIG. 11;

Figure 1:
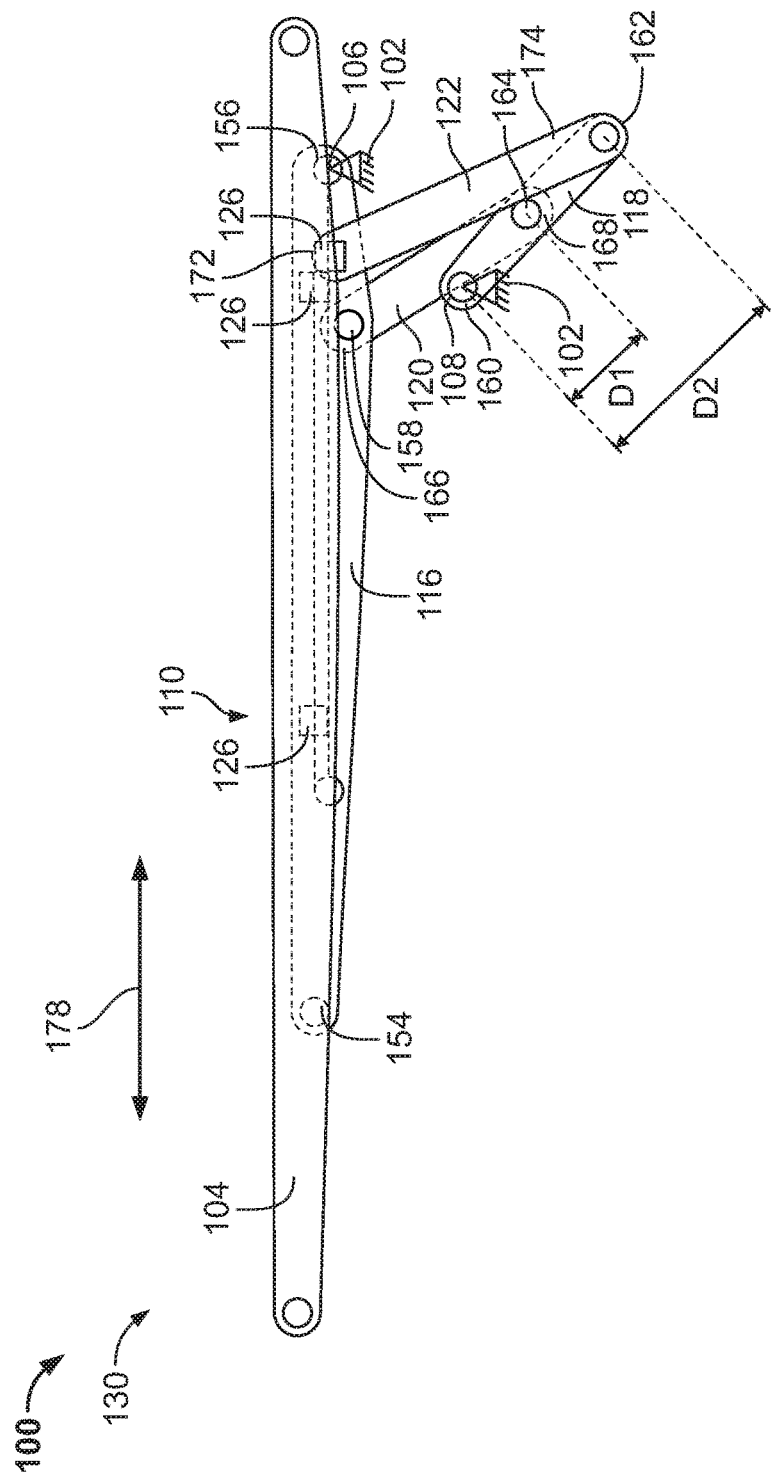
FIG. 1 is a schematic view of a first example vehicle energy source port door in a closed position according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Embodiments of the present disclosure provide a vehicle energy source door that protrudes minimally behind a vehicle body, resists downward deflection, and reduces installation complexity of the vehicle energy source door in a body of a vehicle.

Figure 2:
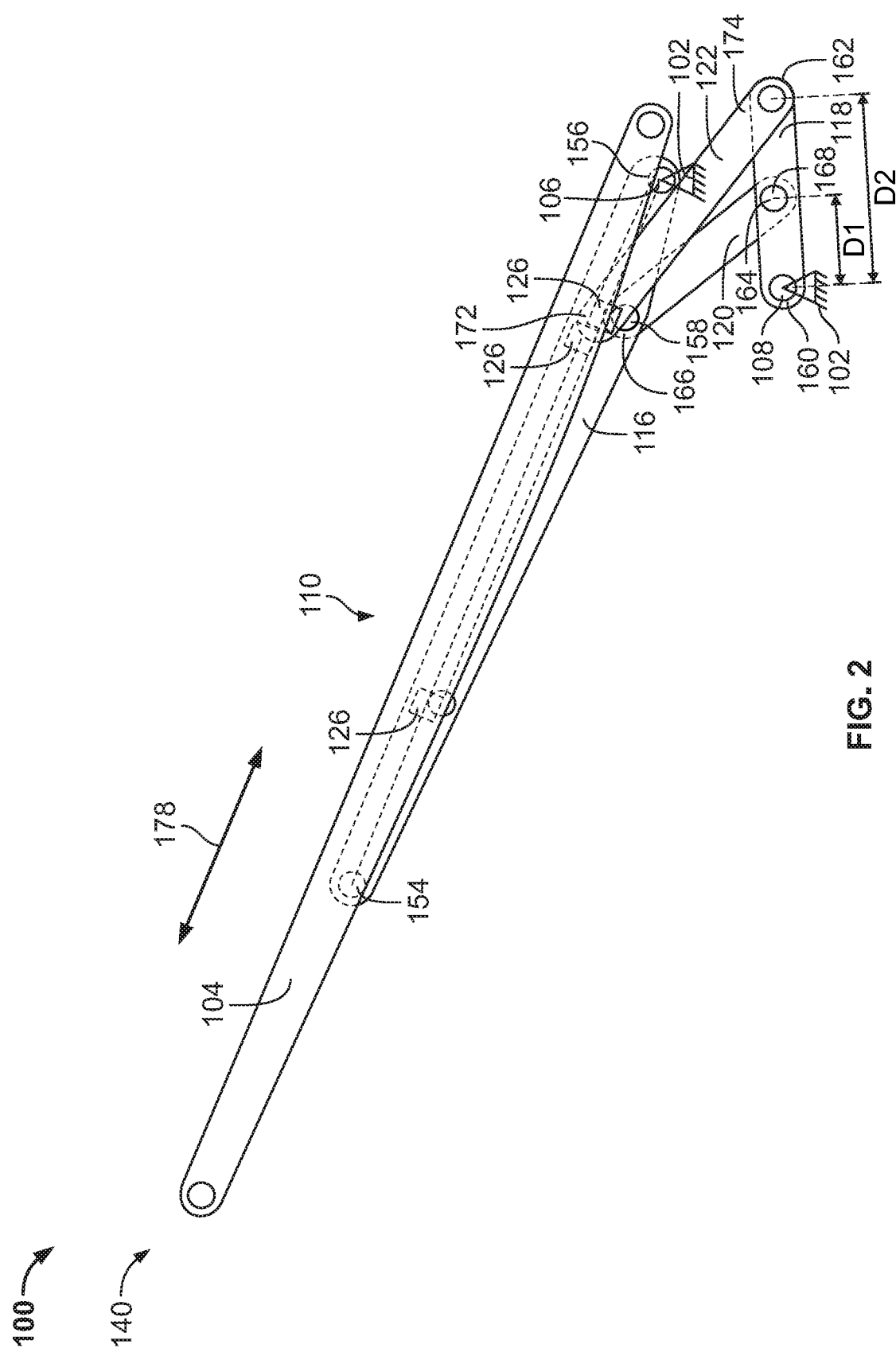
FIG. 2 is a schematic view of the first example vehicle energy source port door of FIG. 1 in an intermediate position.
Figure 3:
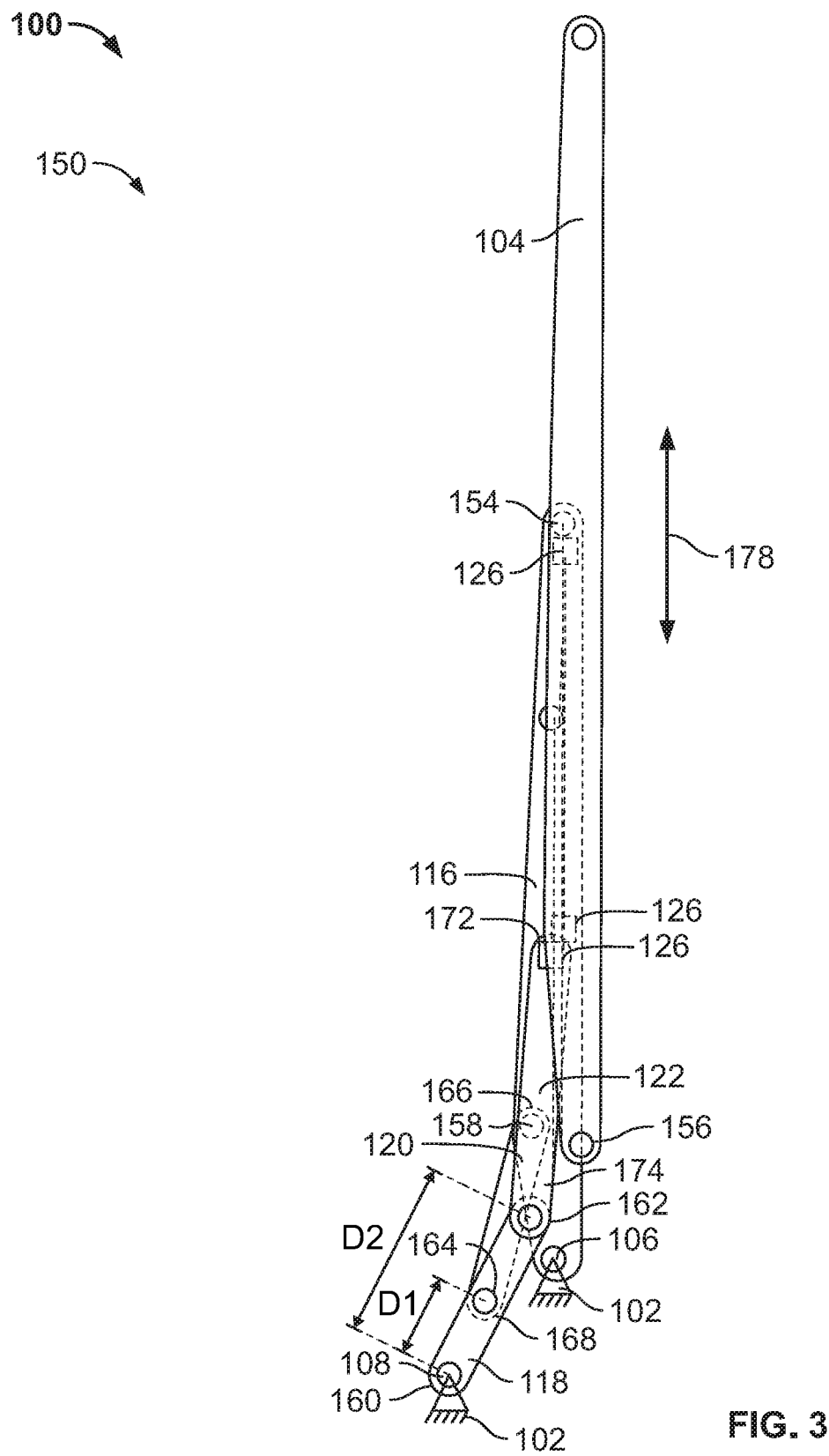
FIG. 3 is a schematic view of the first example vehicle energy source port door of FIGS. 1 and 2 in a closed position.

A first example vehicle energy source port door 100 according to an embodiment of the present disclosure is depicted in FIGS. 1-3. The first example vehicle energy source port door 100 includes a housing 102, a flap 104, a first pivot mount 106, a second pivot mount 108, and a linkage assembly 110. The linkage assembly 110 includes a paddle link 116, a relay link 118, a driver link 120, a driven link 122, the flap 104, and one or more sliders 126. The flap 104 is articulatingly connected to the housing 102 via the linkage assembly 110. The linkage assembly 110 pivots and translates the flap 104 relative to the housing 102.

With reference to FIG. 1, the vehicle energy source port door 100 is in a closed position 130. With reference to FIG. 2, the vehicle energy source port door 100 is in an intermediate position 140. With reference to FIG. 3, the vehicle energy source port door 100 is in an open position 150.

With reference to FIGS. 1-3 the housing 102 is configured to install into an opening defined by a body of a vehicle that interfaces with a recharging receptacle and/or a fuel filler of the vehicle (not shown). The housing 102 supports the first and second pivot mounts 106, 108. The first and second pivot mounts 106, 108 are oriented to allow linkages or hinges to pivot about axes that are generally parallel to the body (not shown).

With reference to FIGS. 1-3, the paddle link 116 has a first end knuckle 154, a second end knuckle 156, and first intermediate knuckle 158. The first intermediate knuckle 158 is between the first end knuckle 154 and the second end knuckle 156. In some embodiments, the first intermediate knuckle 158 is offset from (e.g., misaligned with, laterally distanced from, non-collinear, etc.) the first end knuckle 154 and the second end knuckle 156. Thus, the first intermediate knuckle 158 forms a corner between the first end knuckle 154 and the second end knuckle 156.

With reference to FIGS. 1-3, the relay link 118 has a third end knuckle 160, a fourth end knuckle 162, and a second intermediate knuckle 164. The second intermediate knuckle 164 is between the third end knuckle 160 and the fourth end knuckle 162. In some embodiments, the second intermediate knuckle 164 is collinear with the third end knuckle 160 and the fourth end knuckle 162.

With reference to FIGS. 1-3, the driver link 120 has a fifth end knuckle 166 and a sixth end knuckle 168. Further, the driven link 122 has a seventh end knuckle 172 and an eighth end knuckle 174.

With reference to FIGS. 1-3 the first pivot mount 106 supports the paddle link 116. The paddle link 116 is pivotably engaged with the first pivot mount 106 at the second end knuckle 156. The second pivot mount 108 supports the relay link 118. The relay link 118 is pivotably engaged with the second pivot mount 108 at the third end knuckle 160. The sixth end knuckle 168 of the driver link 120 is pivotably connected to the second intermediate knuckle 164 of the relay link 118 at a first distance D1 from the second pivot mount 108. The fifth end knuckle 166 of the driver link 120 is pivotably connected to the first intermediate knuckle 158 the paddle link 116. When the paddle link 116 is pivotably opened or closed, the driver link 120 moves the relay link 118 about the second pivot mount 108. In other words, the driver link 120 drives the relay link 118 around the second pivot mount 108. The fourth end knuckle 162 of the relay link 118 is pivotably connected to the eighth end knuckle 174 of the driven link 122 at a second distance D2 from the second pivot mount 108. The second distance D2 is greater than the first distance D1. In other words, the relay link 118 relays movement of the driver link 120 to the driven link 122. The seventh end knuckle 172 of the driven link 122 is slidably connected to the flap 104. When the paddle link 116 pivots about the first pivot mount 106, the driver link 120 moves the relay link 118. When the relay link 118 moves, the driven link 122 moves by a larger distance than the relay link 118.

With reference to FIGS. 1-3, the flap 104 may consist of a single piece that is constructed to appear as part of the vehicle body, or may consist of multiple pieces to support and orient an additional piece that is constructed to appear as part of the vehicle body. The flap 104 is slidably connected to the paddle link 116 by one or more sliders 126. Thus, the flap 104 translates, as indicated by arrow 178, along a defined path relative to the paddle link 116. The driven link 122 is connected to the flap 104. With reference to FIG. 1, the flap 104 overshadows the paddle link 116 when the flap 104 is in the closed position 130.

With reference to FIG. 3, in operation, when the flap 104 moves toward the open position 150, the driver link 120 moves the relay link 118, which moves the driven link 122 to translate the flap 104 away from the first pivot mount 106. Thus the flap 104 has clearance relative to the vehicle body.

With reference to FIG. 1, in operation, when the flap 104 moves toward the closed position 130, the driver link 120 moves the relay link 118, which moves the driven link 122 to translate the flap 104 toward the first pivot mount 106. Thus the flap 104 may be flush with the vehicle body.

A second example vehicle energy source port door 200 according to an embodiment of the present disclosure is depicted in FIGS. 4-23. The vehicle energy source port door 200 includes a housing 202, a first pivot mount 208, a second pivot mount 210, and a linkage assembly 212. The linkage assembly includes an intermediate link 216, a driven link 218, a flap 220, a driver link 222, and a passive link 224.

Figure 4:
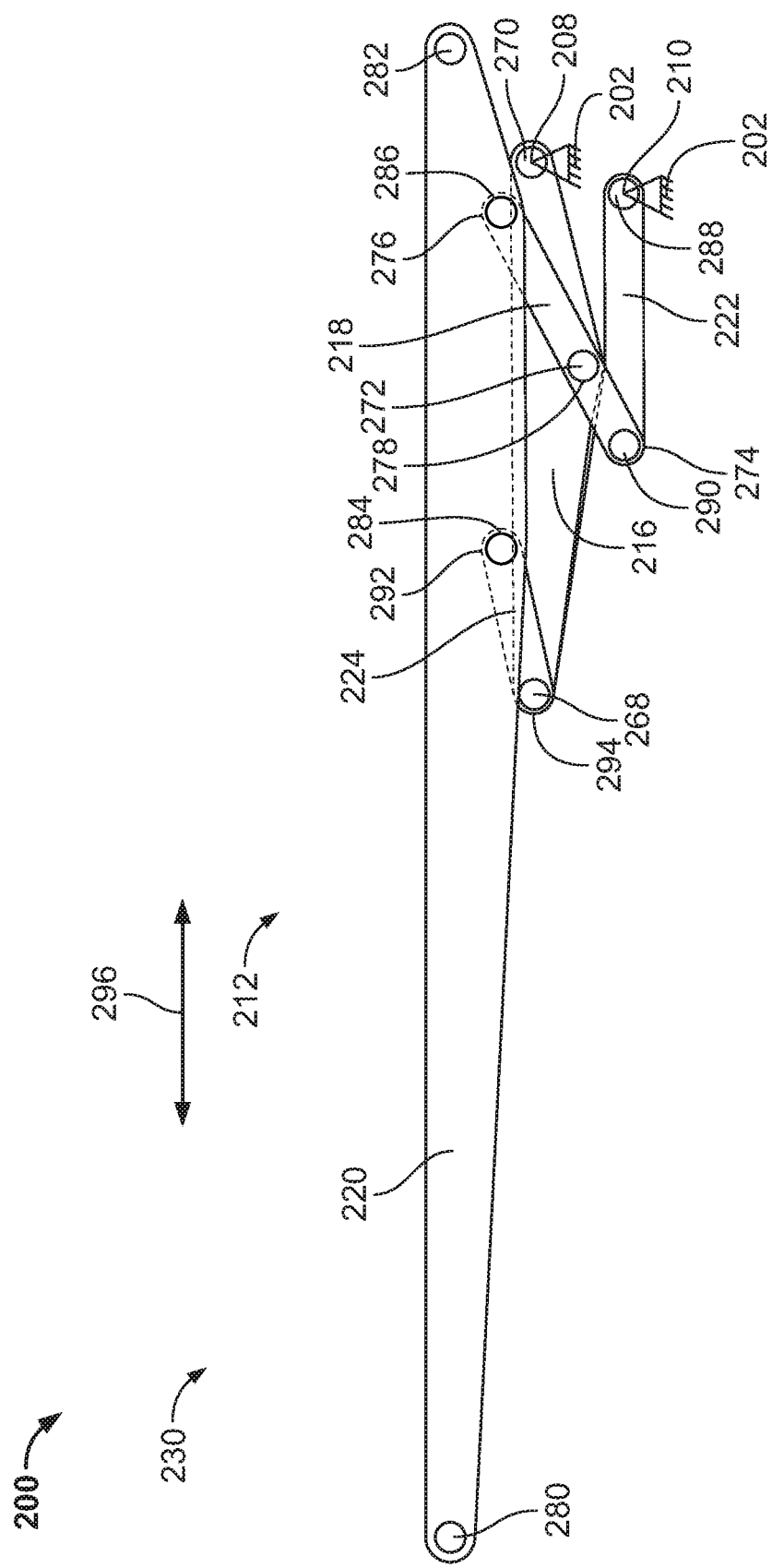
FIG. 4 is a schematic view of a second example vehicle energy source port door in a closed position according to an embodiment of the present disclosure.
Figure 5:
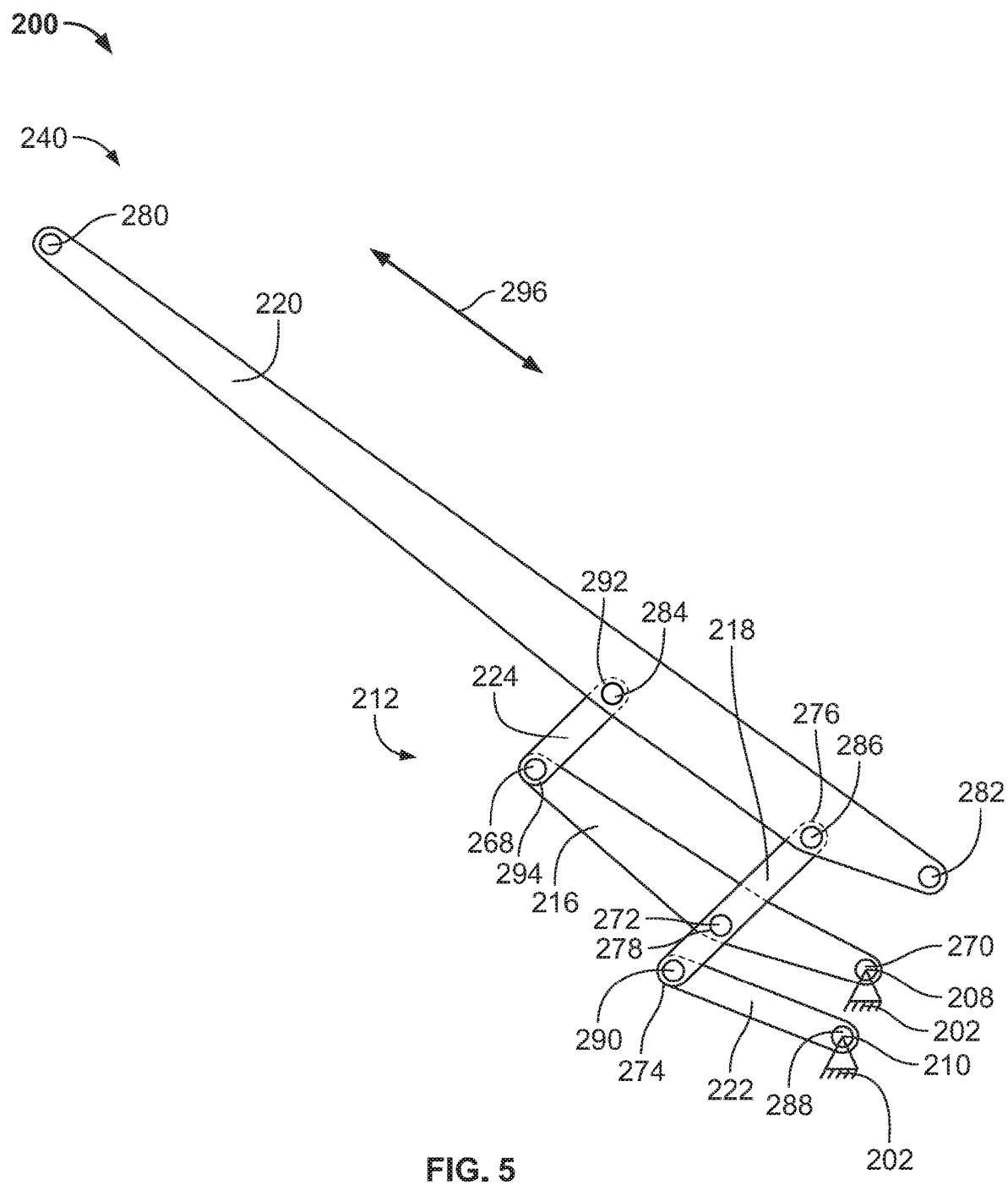
FIG. 5 is a schematic view of the second example vehicle energy source port door of FIG. 4 in an intermediate position.
Figure 6:
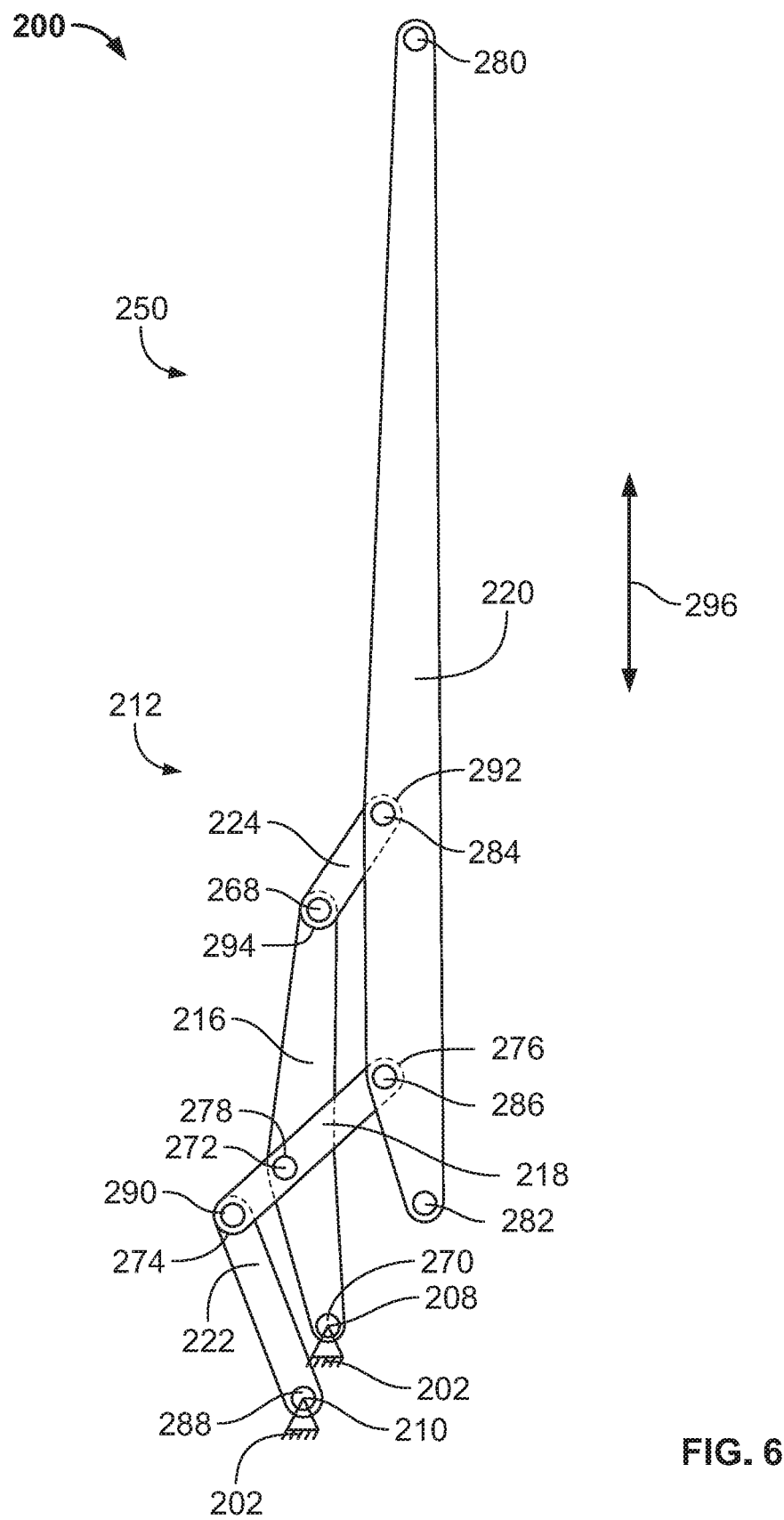
FIG. 6 is a schematic view of the second example vehicle energy source port door of FIGS. 4 and 5 in a closed position.
Figure 9:
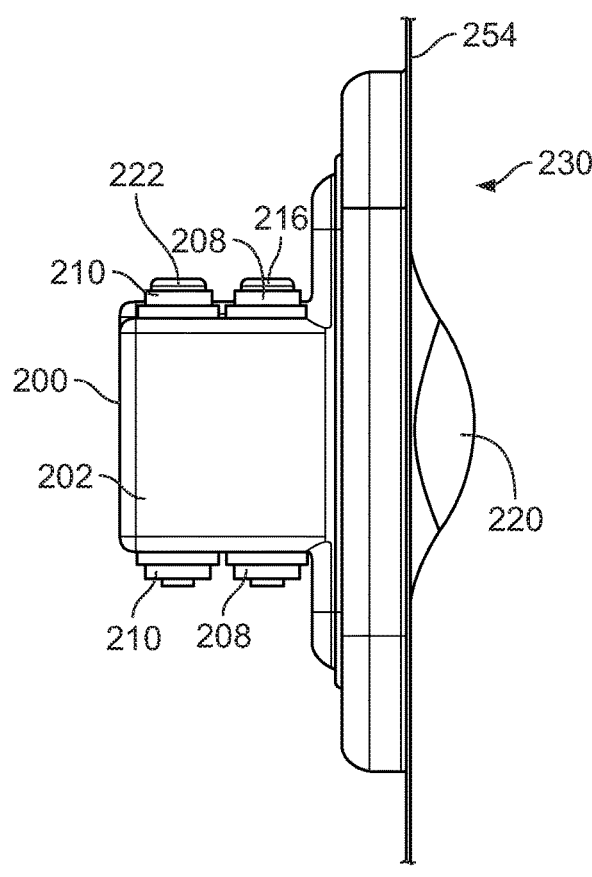
FIG. 9 is an end view of the second example vehicle energy source port door of FIGS. 4-8 installed in the body panel of FIGS. 7 and 8.
Figure 10:
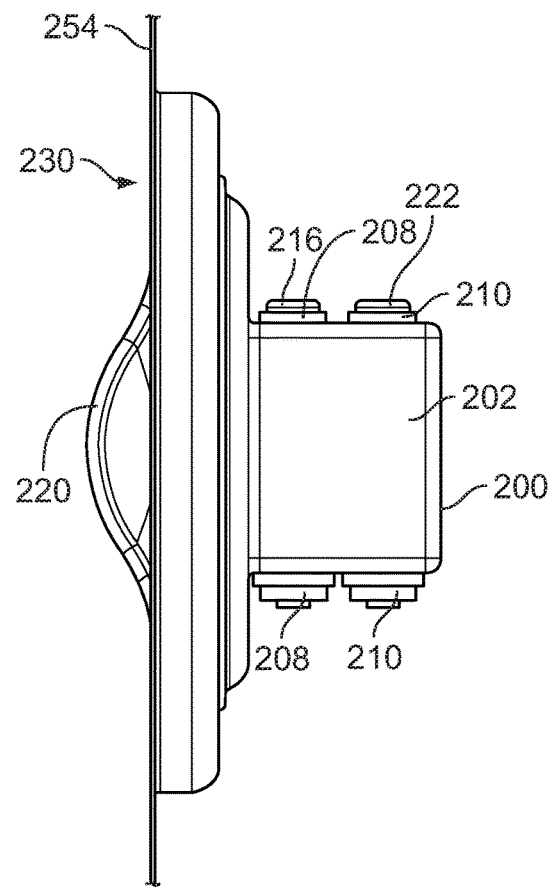
FIG. 10 is another end view of the second example vehicle energy source port door of FIGS. 4-9 installed in the body panel of FIGS. 7-9.
Figure 11:
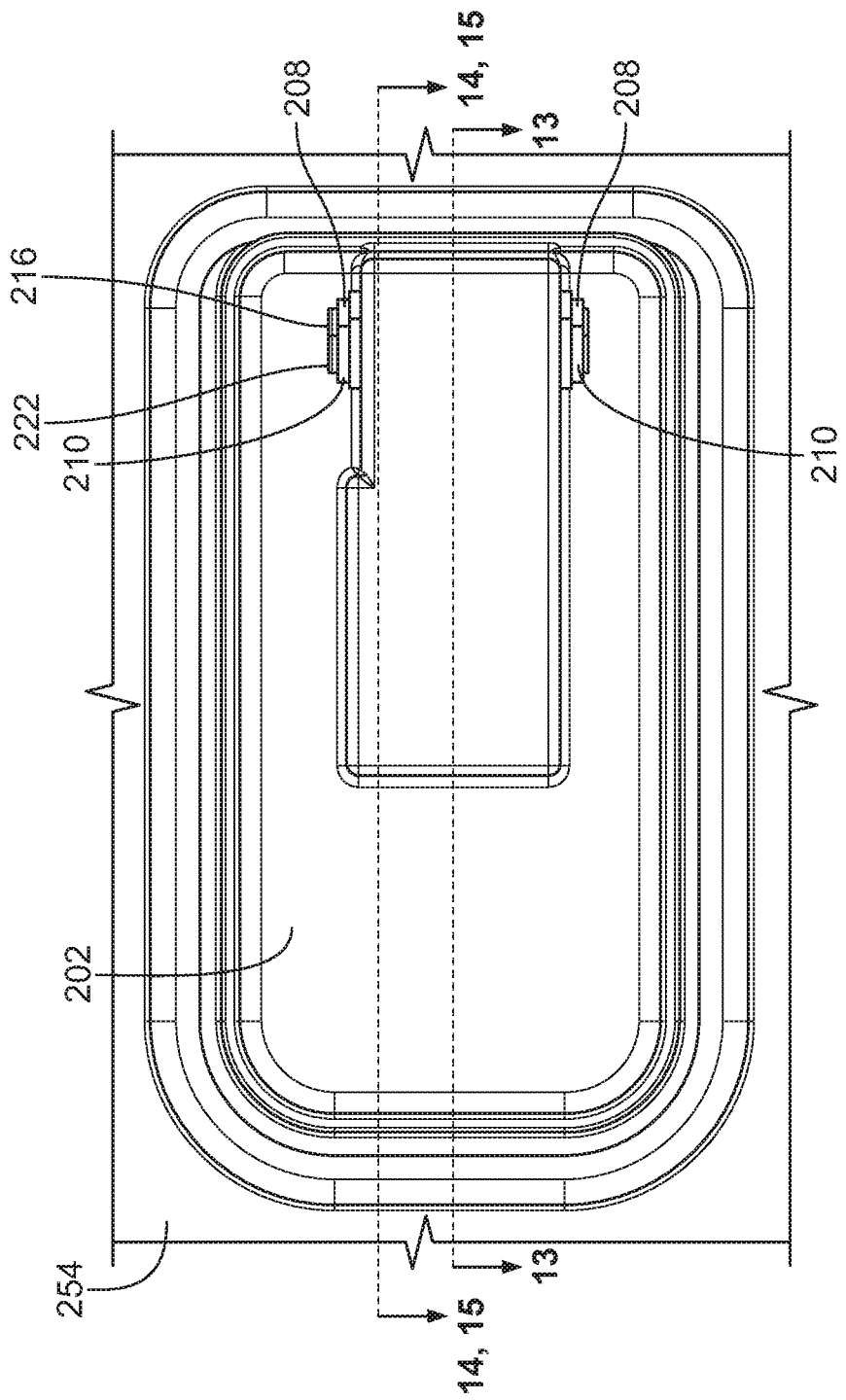
FIG. 11 is a rear view of the second example vehicle energy source port door of FIGS. 4-10 installed in the body panel of FIGS. 7-10.

With reference to FIG. 4, the vehicle energy source port door 200 is in a closed position 230. With reference to FIG. 5, the vehicle energy source port door 200 is in an intermediate position 240. With reference to FIG. 6, the vehicle energy source port door 200 is in an open position 250.

With reference to FIGS. 8-13, the housing 202 is configured to install into an opening defined by a body panel 254. With reference to FIGS. 16-21, the housing 202 is also configured to interface with a recharging receptacle 256. Additionally or alternatively, the housing 202 is configured to interface with a fuel filler (not shown). With reference to FIGS. 4-6 and 8-18, the housing 202 supports the first and second pivot mounts 208, 210. With reference to FIGS. 8-10, 12, and 13, the first and second pivot mounts 208, 210 are oriented to allow the linkage assembly 212 to pivot about axes that are generally parallel to the body panel 254.

Figure 14:
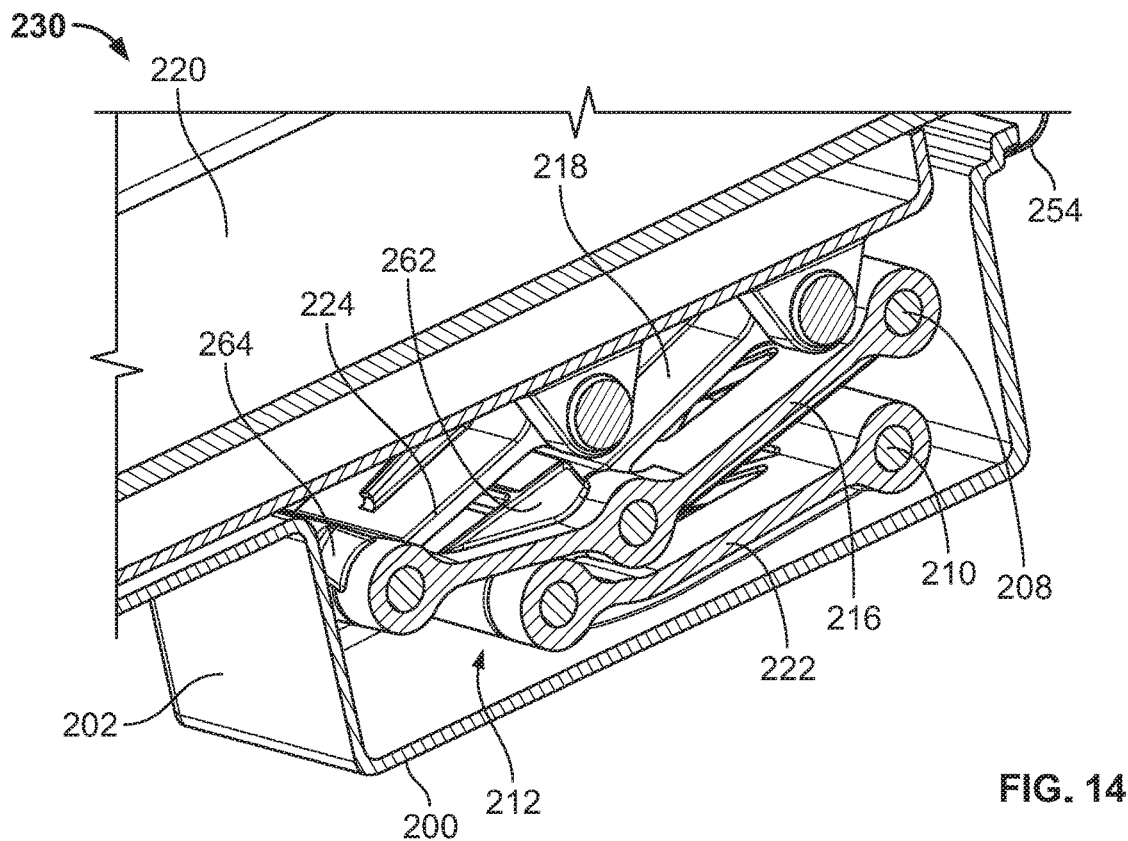
FIG. 14 is an isometric cross-sectional view of the second example vehicle energy source port door of FIGS. 4-13 installed in the body panel of FIGS. 7-13, taken along line 14-14 of FIG. 11.
Figure 15:
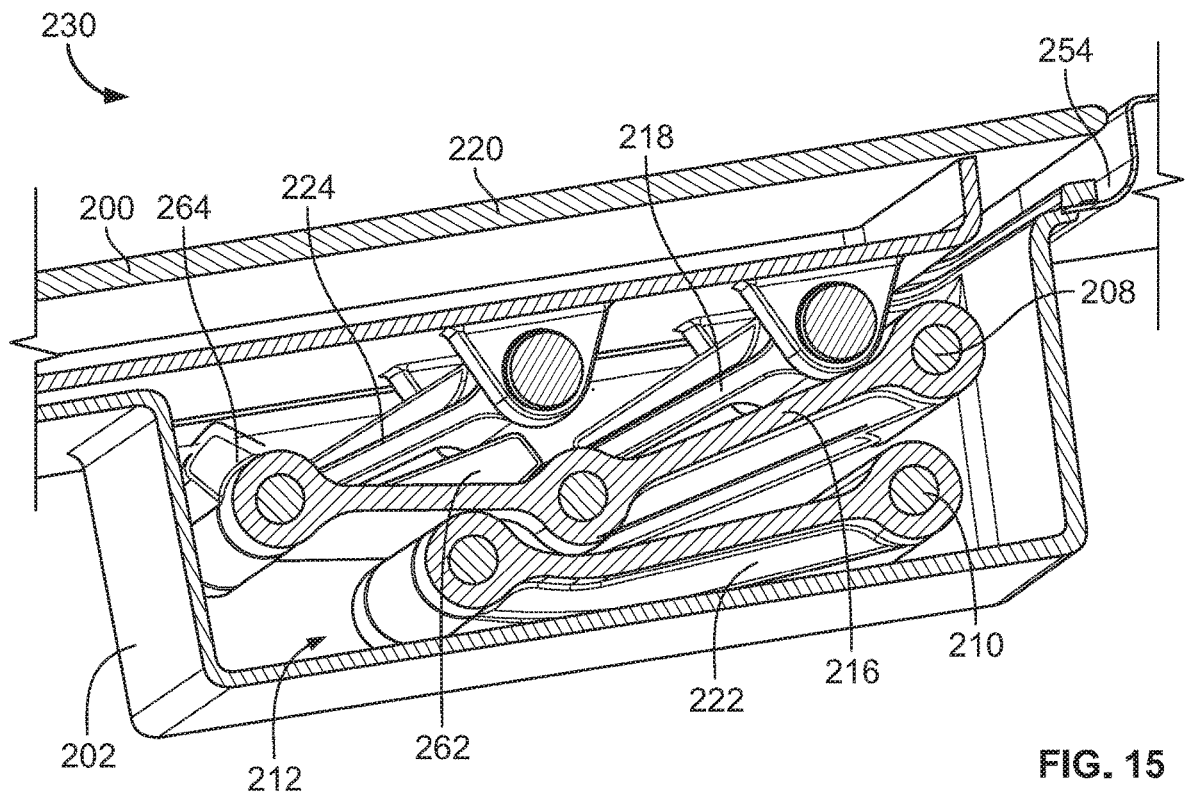
FIG. 15 is another isometric cross-sectional view of the second example vehicle energy source port door of FIGS. 4-14 installed in the body panel of FIGS. 7-14 taken along line 15-15 of FIG. 11.
Figure 16:
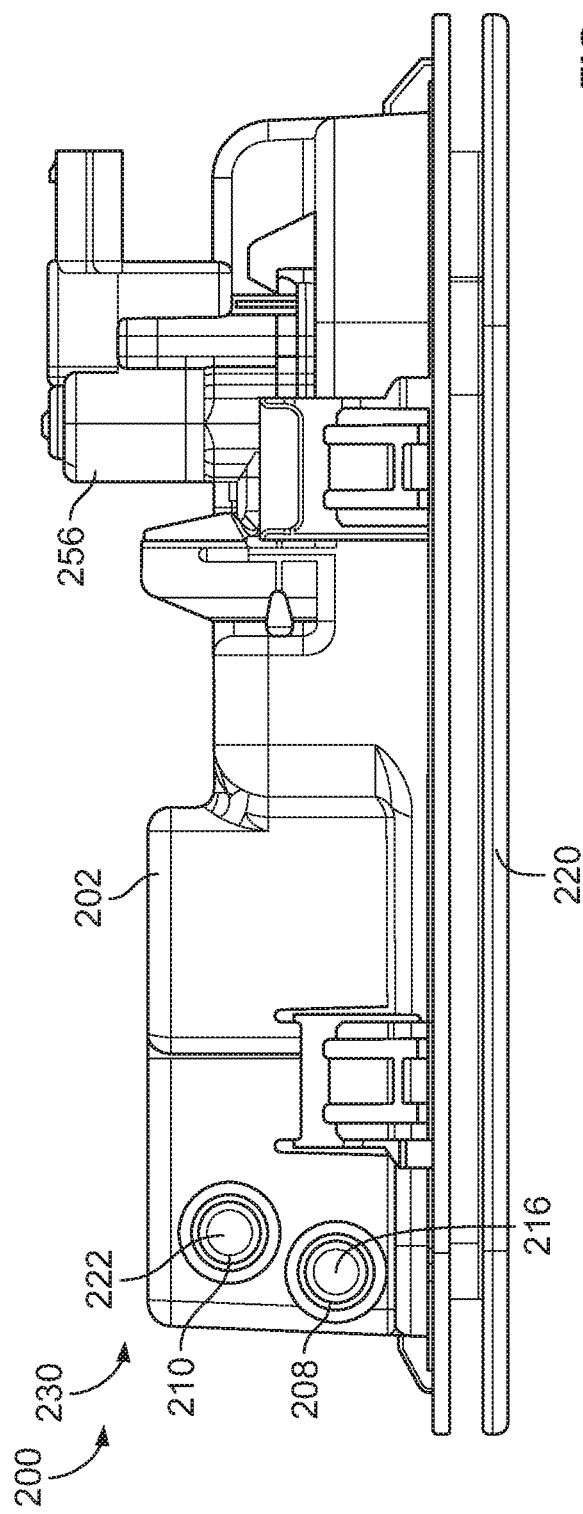
FIG. 16 is a top view of the second example vehicle energy source port door of FIGS. 4-15 in a closed position and connected to a vehicle charging port assembly.
Figure 17:
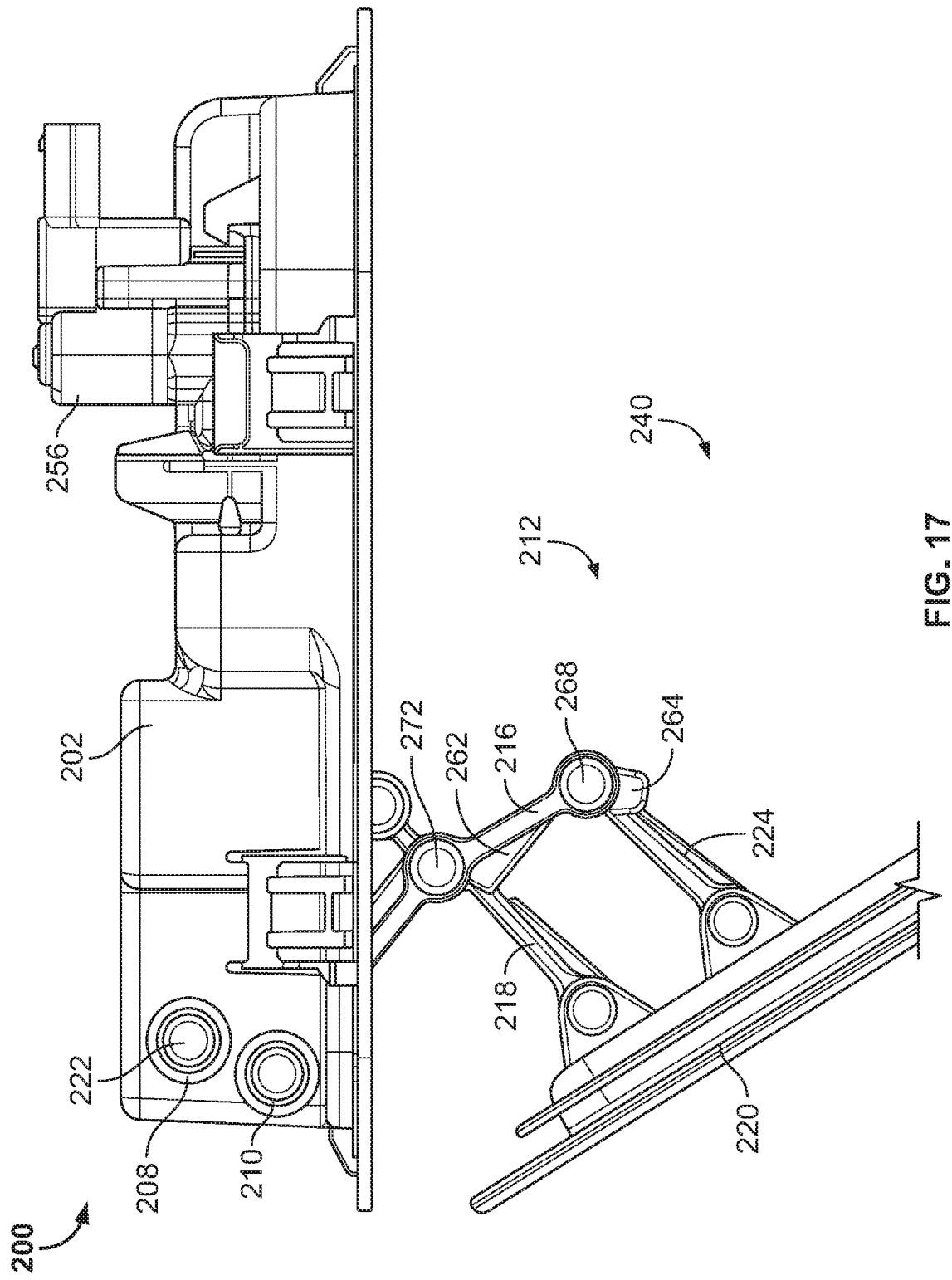
FIG. 17 is a top view of the second example vehicle energy source port door of FIGS. 4-16 in an intermediate position and connected to the vehicle charging port assembly of FIG. 16.
Figure 18:
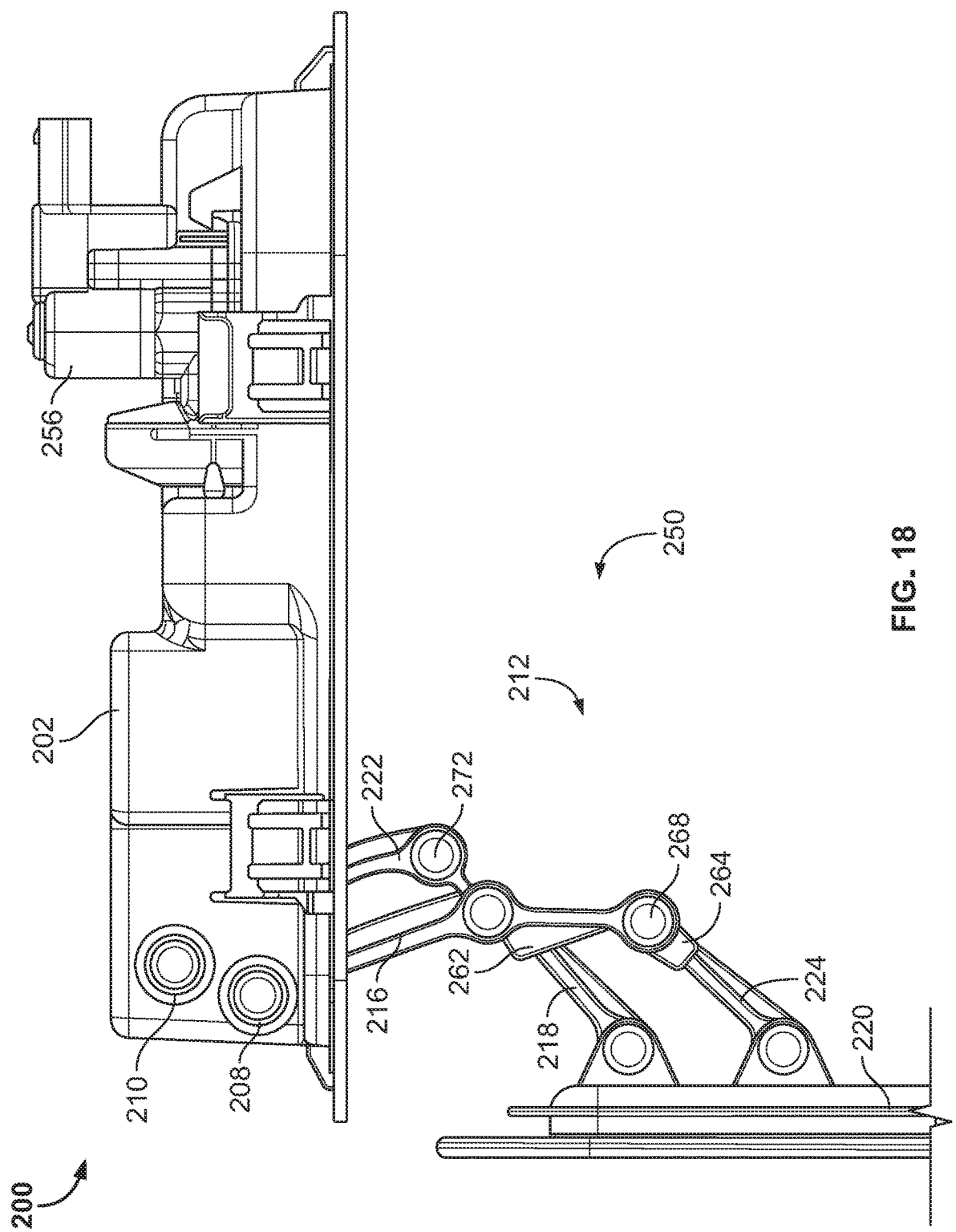
FIG. 18 is a top view of the second example vehicle energy source port door of FIGS. 4-17 in an open position and connected to the vehicle charging port assembly of FIGS. 16 and 17.
Figure 19:
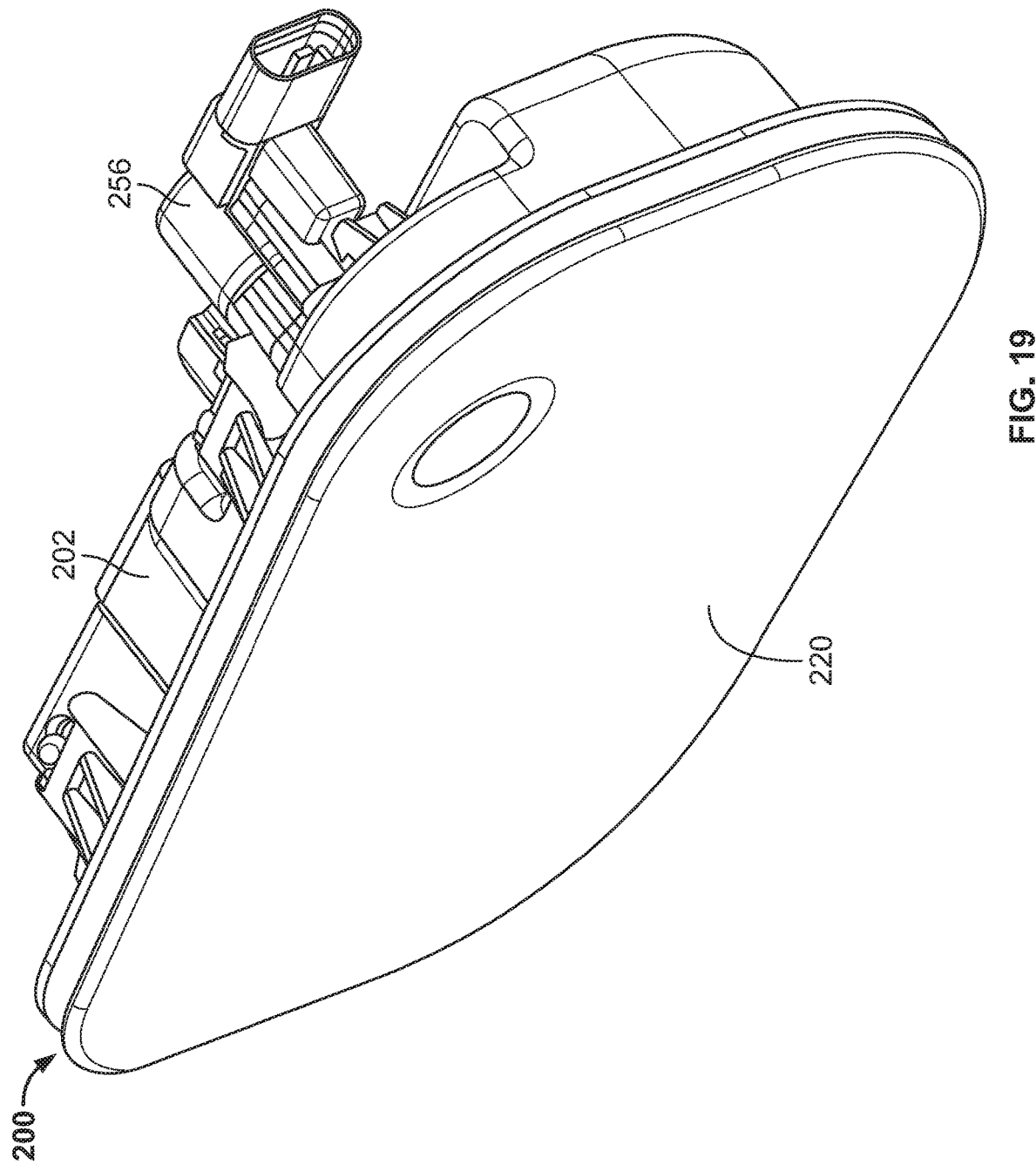
FIG. 19 is an isometric view of the second example vehicle energy source port door of FIGS. 4-18 in the closed position and connected to the vehicle charging port assembly of FIGS. 16-18.
Figure 20:
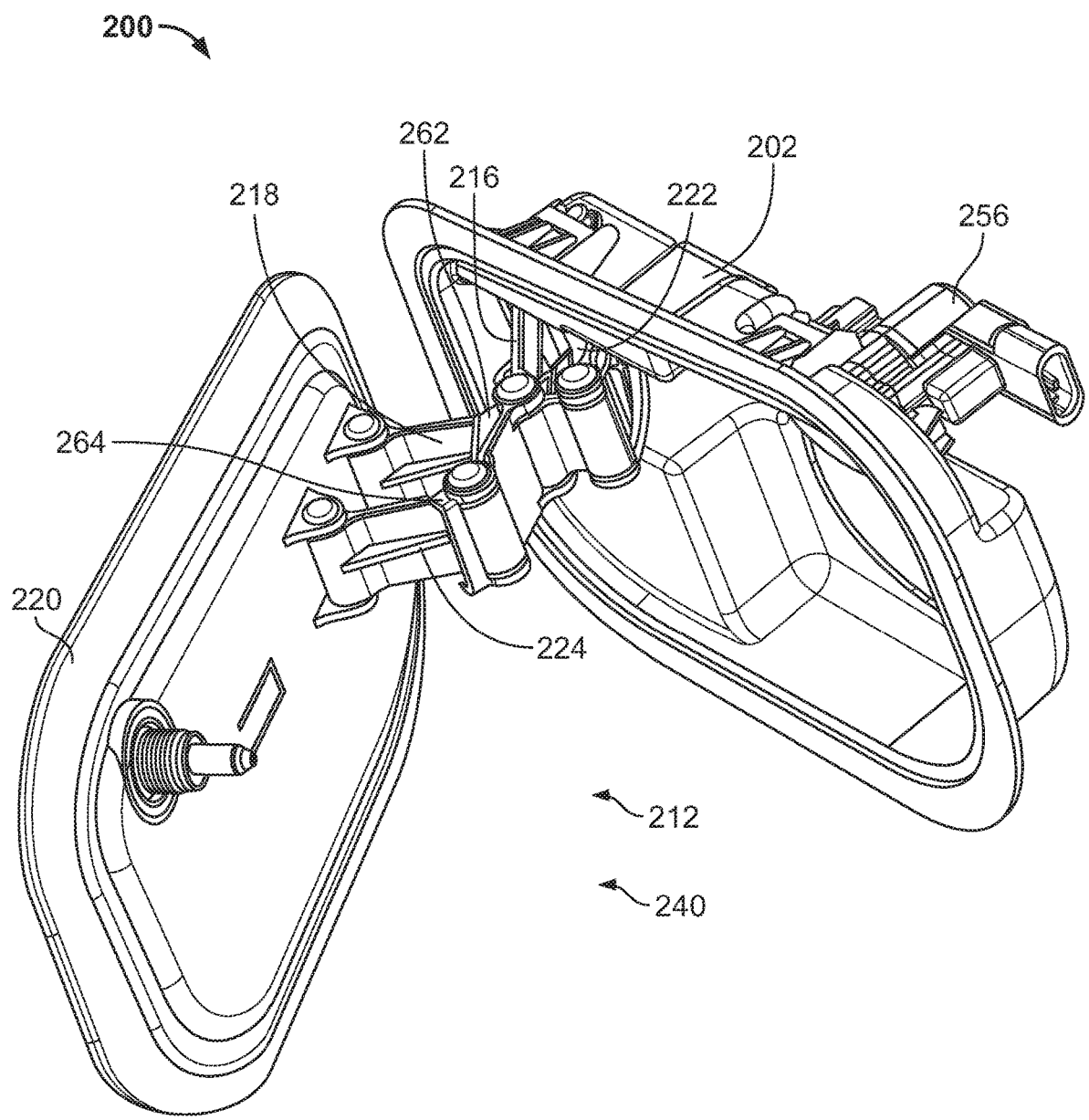
FIG. 20 is an isometric view of the second example vehicle energy source port door of FIGS. 4-19 in an intermediate position and connected to the vehicle charging port assembly of FIGS. 16-19.
Figure 21:
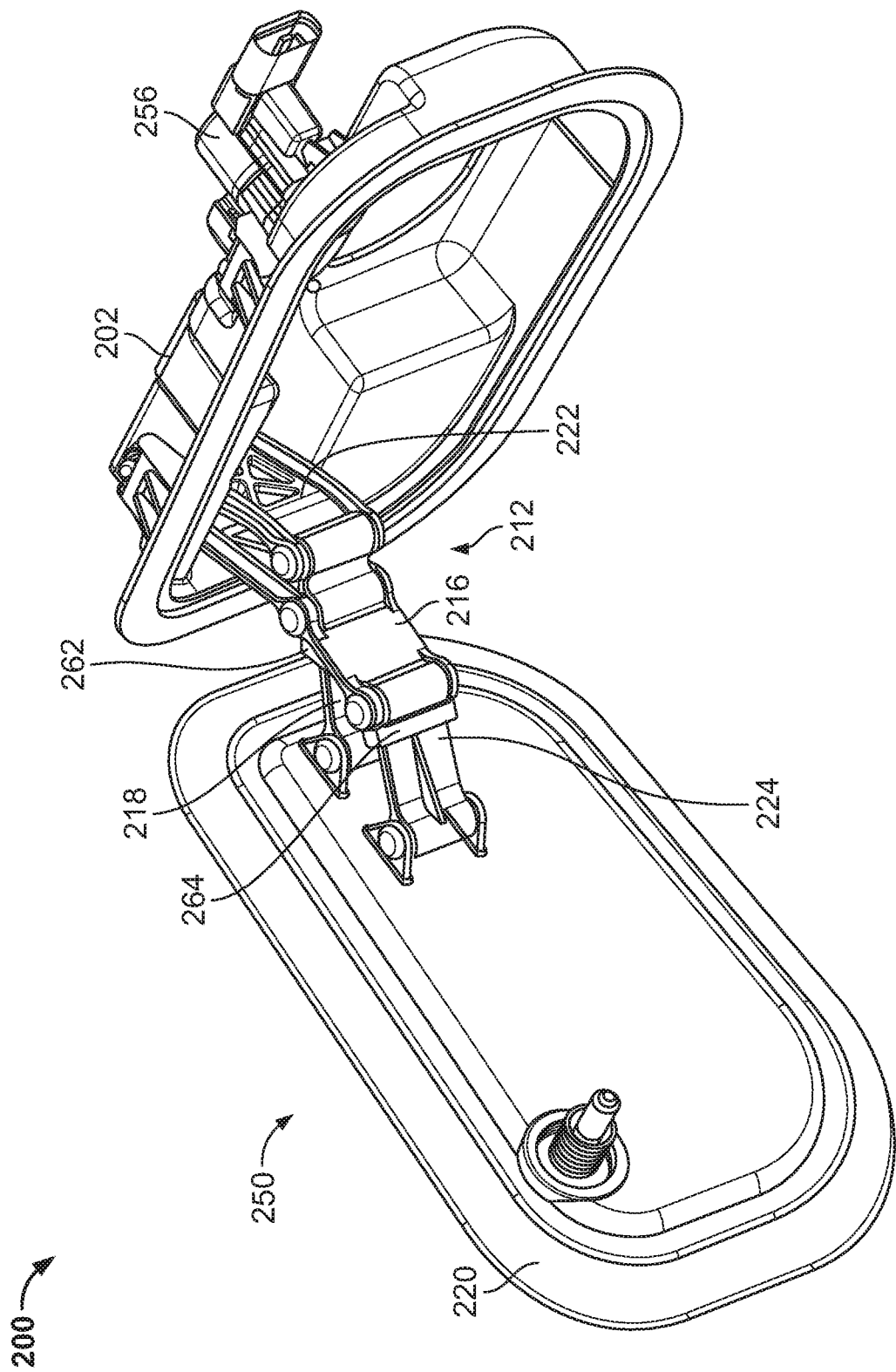
FIG. 21 is an isometric view of the second example vehicle energy source port door of FIGS. 4-20 in an open position and connected to the vehicle charging port assembly of FIGS. 16-20.
Figure 22:
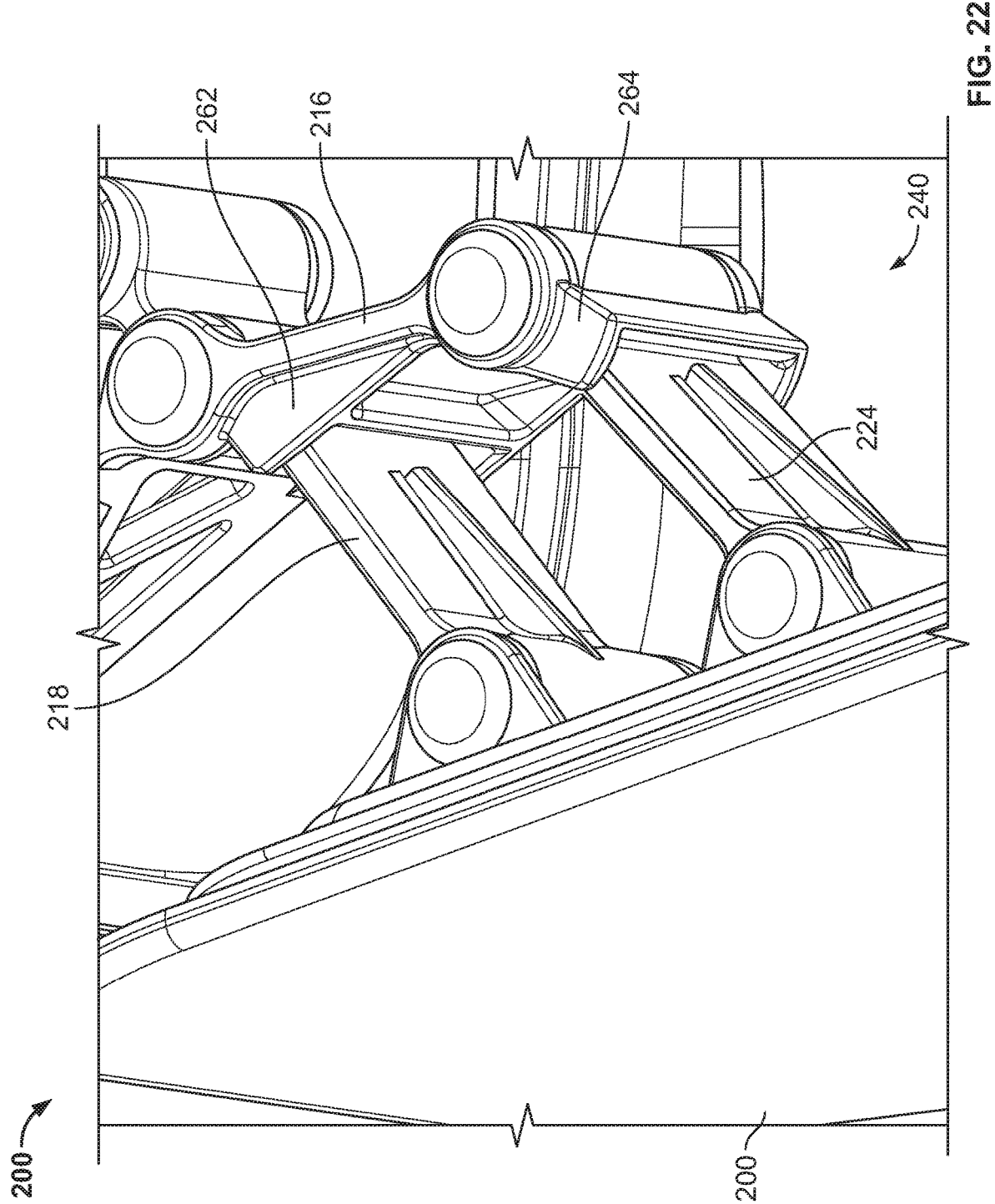
FIG. 22 is an enlarged isometric view of a linkage of the second example vehicle energy source port door of FIGS. 4-21 in an intermediate position.

With reference to FIGS. 4-6, 13-15, 17-18, 20, and 21 the intermediate link 216 pivots about the first pivot mount 208. With reference to FIGS. 13-15, when the intermediate link 216 is in the closed position 230, the intermediate link 216 is approximately parallel to the body panel 254. In other words, when the linkage assembly 212 is in the closed position 230, the linkage assembly 212 is disposed (e.g., nested, folded, retracted, etc.) in the housing 202. With reference to FIGS. 6, 18, and 21, when the intermediate link 216 is in the open position 250, the intermediate link 216 is approximately perpendicular to the vehicle body 204. With reference to FIGS. 13-15, 17, 18, and 20-23, the intermediate link 216 has a first set of interlocking tabs 262 and a second set of interlocking tabs 264.

With reference to FIGS. 4-6, the intermediate link 216 has a first end knuckle 268, a second end knuckle 270, and a first intermediate knuckle 272. The first intermediate knuckle 272 is between the first end knuckle 268 and the second end knuckle 270. In some embodiments, the first intermediate knuckle 272 is offset from the first end knuckle 268 and the second end knuckle 270. Thus, the first intermediate knuckle 272 forms a corner between the first end knuckle 268 and the second end knuckle 270.

With reference to FIGS. 4-6, the driven link 218 has a third end knuckle 274, a fourth end knuckle 276, and a second intermediate knuckle 278. The second intermediate knuckle 278 is between the third end knuckle 274 and the fourth end knuckle 276. In some embodiments, the second intermediate knuckle 278 is collinear with the third end knuckle 274 and the fourth end knuckle 276.

With reference to FIGS. 4-6, the flap 220 has a fifth end knuckle 280, a sixth end knuckle 282, a third intermediate knuckle 284, and a fourth intermediate knuckle 286. The third intermediate knuckle 284 is between the fifth end knuckle 280 and the fourth intermediate knuckle 286. The fourth intermediate knuckle 286 is between the third intermediate knuckle 284 and the sixth end knuckle 282. In some embodiments, the third intermediate knuckle 284 and the fourth intermediate knuckle 286 are offset from the fifth end knuckle 280 and the sixth end knuckle 282.

With reference to FIGS. 4-6, the driver link 222 has a seventh end knuckle 288 and an eighth end knuckle 290. Further, the passive link 224 has a ninth end knuckle 292 and a tenth end knuckle 294.

With reference to FIGS. 4-6, 13-15, 17, 18, and 20-23, the second intermediate knuckle 278 of the driven link 218 pivotably connects to the first intermediate knuckle 272 of the intermediate link 216. The fourth end knuckle 276 of the driven link 218 pivotably connects to the fourth intermediate knuckle 286 of the flap 220. The third end knuckle 274 of the driven link 218 pivotably connects to the eighth end knuckle 290 of the driver link 222. When the driven link 218 moves toward the open position 250, the flap 220 translates relative to (e.g., away from) the housing 202, as indicated by arrow 296.

With reference to FIGS. 4-10 and 12-15, the flap 220 may consist of a single piece that is constructed to appear as part of the body panel 254, or may consist of multiple pieces to support and orient an additional piece that is constructed to appear as part of the vehicle body.

With reference to FIGS. 4-6, 13-15, 17, 18, and 20-23, the driver link 222 pivots on the second pivot mount 210. The driver link 222 is pivotably connected to the driven link 218. With reference to FIGS. 4-6, the driver link 222 is connected to the second pivot mount 210 via the seventh end knuckle 288. Further, the eighth end knuckle 290 of the driver link 222 is connected to the third end knuckle 274 of the driven link 218. With reference to FIGS. 6, 18, and 21, in operation, when the intermediate link 216 moves toward the open position 250 from the intermediate position 240 (shown in FIG. 5), the intermediate link 216 pulls the driven link 218 away from the housing 202. The driver link 222 in turn pulls the driven link 218 toward the housing 202. Thus, the driven link 218 pivots relative to the intermediate link 216 and pushes the flap 220 away from the housing 202.

With reference to FIGS. 6, 18, and 21, further in operation, when the intermediate link 216 moves away from the open position 250 toward the intermediate position 240 (shown in FIG. 5), the intermediate link 216 pushes the driven link 218 toward the housing 202. The driver link 222 in turn pushes the driven link 218 away from the housing 202. Thus, the driven link 218 pivots relative to the intermediate link 216 and pulls the flap 220 toward the housing 202.

With reference to FIGS. 4-6, 13-15, 17, 18, and 20-23, the passive link 224 is pivotably connected to the intermediate link 216. The passive link 224 is pivotably connected to the flap 220. With reference to FIGS. 4-6, the tenth end knuckle 294 of the passive link 224 is connected to the first end knuckle 268 of the intermediate link 216. Further, the ninth end knuckle 292 is connected to the third intermediate knuckle 284 of the flap 220. When the intermediate link 216 pushes the passive link 224, the passive link 224 constrains the flap 220 through a range of motion of the linkage assembly 212. Thus, the passive link 224 and the driven link 218 keep the flap 220 aligned with the intermediate link 216. In other words, the flap 220 is articulatingly connected to the housing 202 via the linkage assembly 212. The linkage assembly 212 pivots and translates the flap 220 relative to the housing 202. Thus, with reference to FIGS. 18 and 21, the linkage assembly 212 articulates (e.g., unfolds, expands, opens, etc.) to extend outwardly from the housing in the open position 250.

With reference to FIGS. 4, 13-15, 17, and 18, the flap 220 is aligned to the body panel 254 in the closed position 230. Additionally with reference to FIGS. 18 and 21, when the flap 220 is in the open position 250, the flap 220 has clearance relative to the housing 202 and the body panel 254 (shown in FIGS. 7-15).

With reference to FIG. 17, the first set of interlocking tabs 262 extends along the intermediate link 216 between the first intermediate knuckle 272 and the first end knuckle 268. The first set of interlocking tabs 262 extend laterally from the intermediate link 216 toward the flap 220. The second set of interlocking tabs 264 extend outwardly from the first end knuckle 268.

Figure 23:
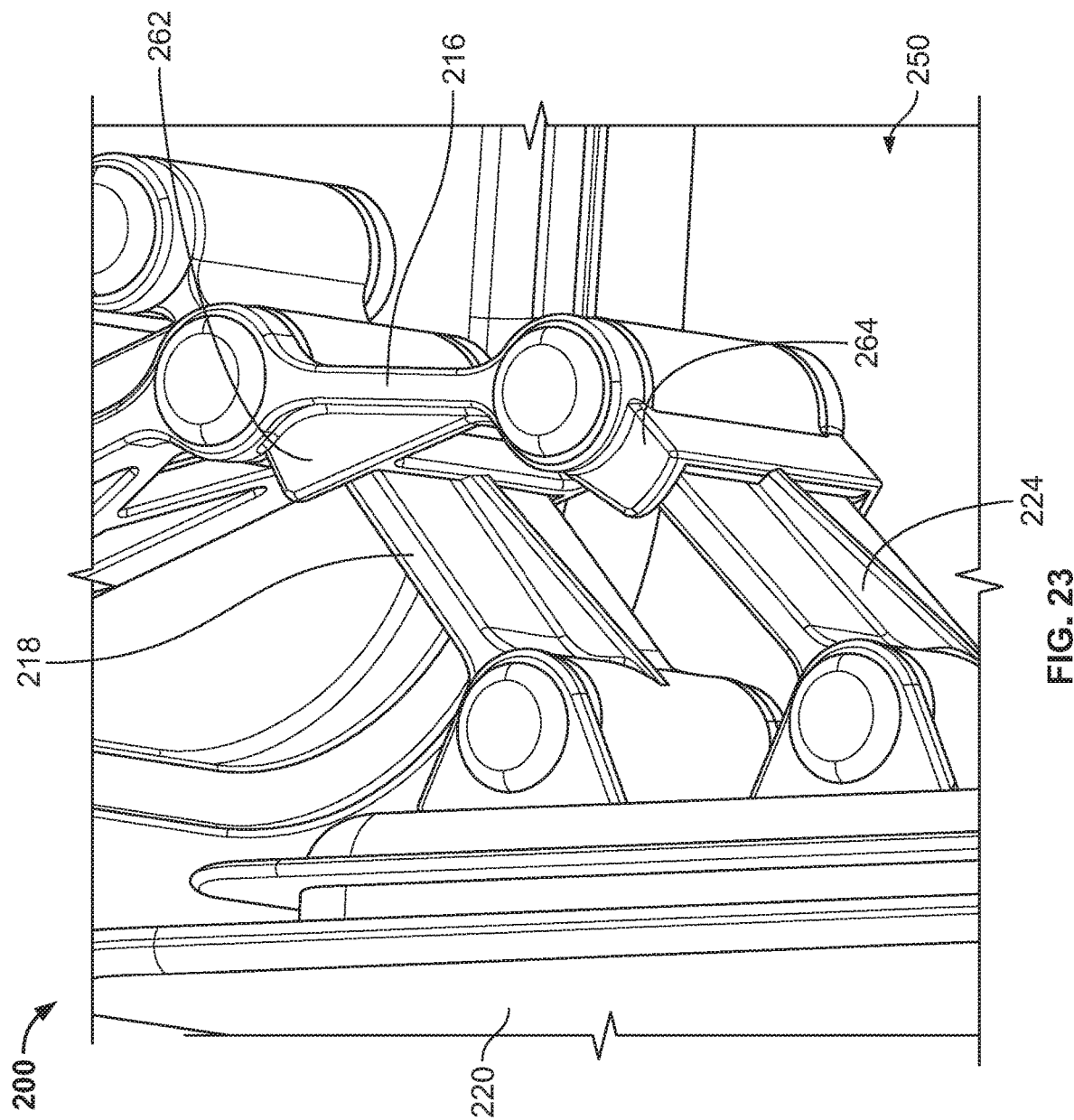
FIG. 23 is an enlarged isometric view of the linkage of FIG. 22 in an open position.

With reference to FIGS. 18, 21, and 23, when the intermediate link 216 is in the open position 250, the first set of interlocking tabs 262 interlocks with the driven link 218. More specifically, as the linkage assembly 212 moves toward the open position 250, the driven link 218 is slidably inserted into the first set of interlocking tabs 262 until the first set of interlocking tabs 262 snapably engages the driven link 218. Further, when the intermediate link 216 is in the open position 250, the second set of interlocking tabs 262 interlocks with the passive link 224. More specifically, as the linkage assembly 212 moves toward the open position 250, the passive link 224 is slidably inserted into the second set of interlocking tabs 264 until the second set of interlocking tabs 264 snapably engages the passive link 224. Thus, the linkage assembly 212 robustly interlocks (e.g., snaps together) in the open position 250 to resist deflection under a load applied parallel to the housing 202 (e.g., a driver resting a hand downwardly on the flap 220, etc.) and to retain the flap in the open position 250. In other words, the linkage assembly 212 is an interlocking linkage assembly 212 that interlocks with itself. In some embodiments, the linkage assembly 212 additionally interlocks with itself in the closed position 230 (not shown).

Figure 24:
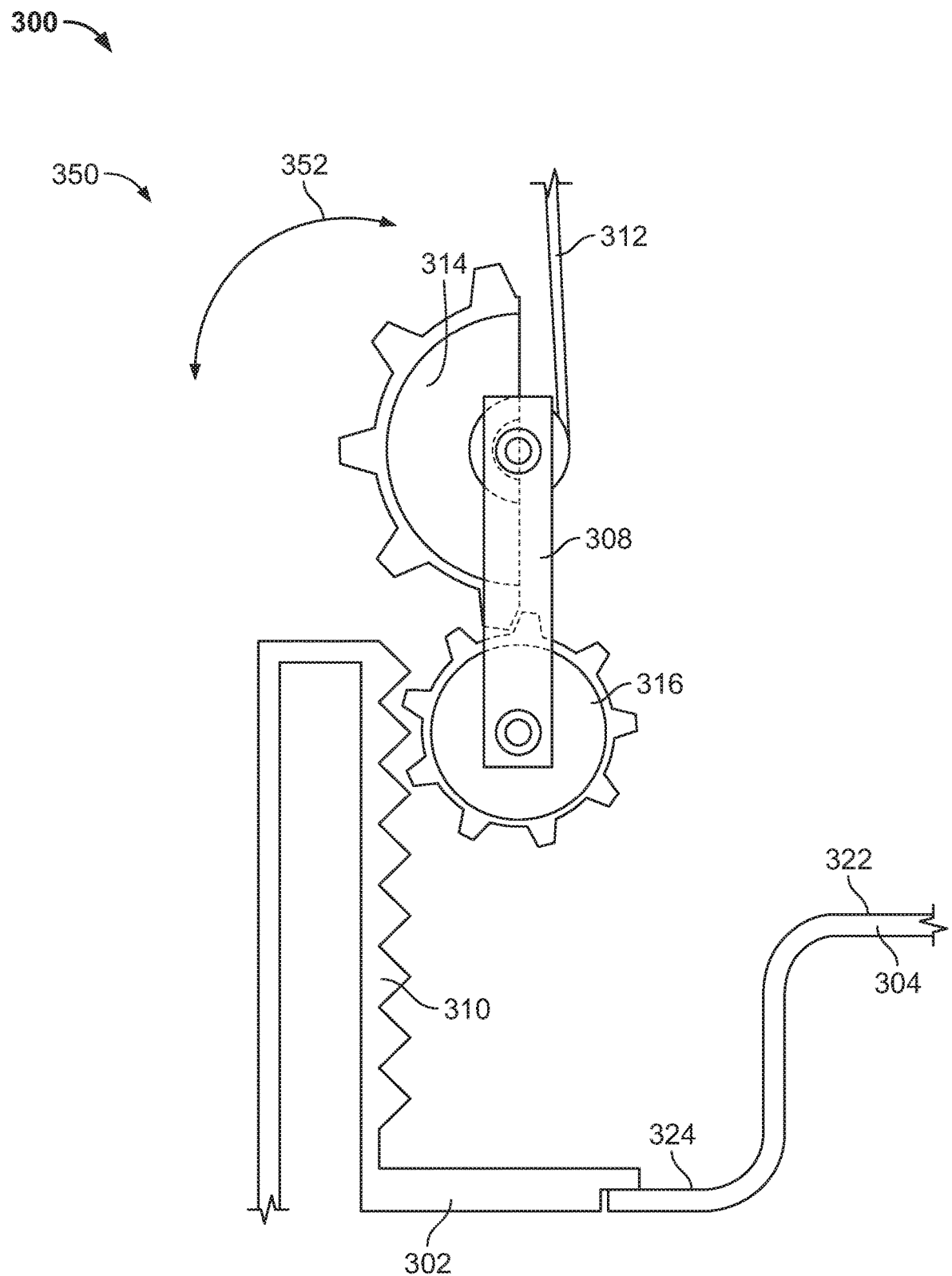
FIG. 24 is a schematic view of a third example vehicle energy source port door in an open position according to an embodiment of the present disclosure.

A third example vehicle energy source port door 300 according to an embodiment of the present disclosure is depicted in FIG. 24. The vehicle energy source port door 300 includes a housing 302 that installs into an opening defined by a body panel 304 of a vehicle. The housing 302 interfaces with the recharging receptacle or fuel filler of the vehicle (not shown). The vehicle energy source port door 300 also includes a lifter 308, a rack gear 310, a flap 312, a lift gear 314, and a pinion gear 316. The body panel 304 has a first outer surface 322 and a second outer surface 324. The third example vehicle energy source port door 300 is shown in an open position 350.

With reference to FIG. 24, the lifter 308 is configured to translate approximately perpendicularly relative to the body panel 304. The rack gear 310 is approximately perpendicular with first outer surface 322 and/or the second outer surface 324 of the body panel 304.

With reference again to FIG. 24, the flap 312 may consist of a single piece that is constructed to appear as part of the body panel 304, or may consist of multiple pieces to support and orient an additional piece that is constructed to appear as part of the body panel 304. The flap 312 is pivotably connected to the lifter 308. The flap 312 incorporates the lift gear 314. The lift gear 314 rotates with the flap 312.

With reference again to FIG. 24, the lift gear 314 interfaces with the pinion gear 316. The pinion gear 316 is rotatably engaged with the lifter 308. The pinion gear 316 is engaged with the rack gear 310 and the lift gear 314. When the flap 312 rotates, as indicated by arrow 352, the lift gear 314 rotates the pinion gear 316. Thus the pinion gear 316 is driven along the rack gear 310 relative to the housing 302. The pinion gear 316 in turn translates the lifter 308 relative to the housing 302. Thus, the flap 312 is translated relative to the housing 302 and the body panel 304 (e.g., toward the open position 350). Additionally, when the flap 312 is in the open position 350, the flap 312 has clearance relative to the housing 302 and the body panel 304. In some embodiments, the rack gear 310 and the lift gear 314 are positioned in different planes. In some embodiments, the rack gear 310 defines a slot (not shown) through which the lift gear 314 moves. Thus, the lift gear 314 and the rack gear 310 have clearance relative to one another and the lift gear 314 may translate relative to the housing 302.

As used herein, panel may refer to any component that may be attached or assembled to another component. Any of the panels described herein may be made of any suitable material, for example, a metal or plastic material.

Embodiments of the present disclosure provide a vehicle port cover, and, more particularly, articulating vehicle energy source doors that are configured to securely cover and shield vehicle recharge receptacles and/or refuel ports. In some embodiments, the articulating vehicle energy source doors include an interlocking linkage assembly, which resist deflection when a load is applied parallel to the pivoting axis of the vehicle energy source door (e.g., downward).

From the foregoing, it will be appreciated that the above example articulating vehicle energy source doors 100, 200, 300 snappingly fit into vehicle body panels in a straight line motion. Thus, the articulating vehicle energy source doors 100, 200, 300 are simpler to install into vehicle body panels. Further, the articulating vehicle energy source doors 100, 200, 300 protrude inwardly less than existing vehicle port doors. Thus, fewer articulating vehicle energy source doors 100, 200, 300 may be damaged during installation, work stoppages along assembly lines utilizing the articulating vehicle energy source doors 100, 200, 300 may be reduced, and time and energy expended associated with the work stoppage may be reduced. Thus, the above-disclosed articulating vehicle energy source doors 100, 200, 300 conserve resources and energy as compared to existing vehicle port doors.

While various spatial and directional terms, such as top, bottom, lower, mid, lateral, horizontal, vertical, front, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

What is claimed is:

1. A vehicle port door, comprising:
  a housing; and
  a flap pivotable relative to the housing via an interlocking linkage assembly, the interlocking linkage assembly including:
    an intermediate link pivotably connected to a first pivot mount, the first pivot mount supported by the housing;
    a driver link pivotably connected to a second pivot mount, the second pivot mount supported by the housing;
    a passive link having a first end and a second end, the first end pivotably connected to the intermediate link and the second end pivotably connected to the flap; and
    a driven link pivotably connected to the driver link, the intermediate link, and the flap,
  wherein the flap is aligned with the housing in a closed position, and
  wherein the flap has clearance relative to the housing in an open position so that the flap is spaced apart from the housing.

2. The vehicle port door of claim 1, wherein the interlocking linkage assembly, in combination with the flap, includes seven pivot connections.

3. The vehicle port door of claim 1, wherein the interlocking linkage assembly is retracted into the housing when the interlocking linkage assembly is in the closed position.

4. The vehicle port door of claim 1, wherein the interlocking linkage assembly extends outwardly from the housing when the interlocking linkage assembly is in the open position, the housing configured to be installed into an opening defined by a body panel.

5. The vehicle port door of claim 1, wherein the intermediate link includes a first set of interlocking tabs and a second set of interlocking tabs.

6. The vehicle port door of claim 5, wherein the first set of interlocking tabs interlock with the driven link of the interlocking linkage assembly when the driven link is slidably inserted into the first set of interlocking tabs.

7. The vehicle port door of claim 6, wherein the first set of interlocking tabs snapably engages the driven link when the interlocking linkage assembly moves toward the open position.

8. The vehicle port door of claim 5, wherein the second set of interlocking tabs interlocks with the passive link of the interlocking linkage assembly when the passive link is slidably inserted into the second set of interlocking tabs.

9. The vehicle port door of claim 8, wherein the second set of interlocking tabs snapably engages the passive link when the interlocking linkage assembly moves toward the open position.

10. The vehicle port door of claim 1, wherein the first set of interlocking tabs extends laterally from the intermediate link toward the flap.

11. The vehicle port door of claim 5, wherein the second set of interlocking tabs extends outwardly from an end knuckle of the intermediate link.

12. The vehicle port door of claim 1, wherein the interlocking linkage assembly pivots and translates the flap relative to the housing.

13. A vehicle port door, comprising:
a flap; and
a linkage assembly, the linkage assembly including:
an intermediate link articulatingly connected to the flap, the intermediate link including a first set of interlocking tabs and a second set of interlocking tabs;
a driver link;
a passive link pivotably connected to the flap and the intermediate link; and
a driven link pivotably connected to the flap, the intermediate link, and the driver link,
wherein the first set of interlocking tabs are configured to snapably engage the driven link and the second set of interlocking tabs are configured to snapably engage the passive link when the flap is in an open position so that the flap resists deflection.

14. A vehicle port door, comprising:
a housing; and
a flap articulatingly connected to the housing via a linkage assembly, the linkage assembly including:
a paddle link pivotably connected to a first pivot mount supported by the housing; and
a relay link pivotably connected to a second pivot mount supported by the housing,
the linkage assembly configured to pivot and translate the flap relative to the housing, and
the linkage assembly disposed in the housing when the flap is a in a closed position.

15. The vehicle port door of claim 13, wherein the linkage assembly interlocks with itself in an open position when the driven link is slidably inserted to an interlocking tab that extends laterally from the intermediate link.

16. The vehicle port door of claim 4, wherein the first and second pivot mounts are arranged to pivot the interlocking linkage assembly about axes that are parallel to the body panel.

17. The vehicle port door of claim 1, wherein each of the flap, the intermediate link, the driver link, the passive link, and the driven link include two or more knuckles, and
wherein an intersection of two knuckles forms a pivot connection.

18. The vehicle port door of claim 17, wherein the paddle link includes a first end knuckle, a second end knuckle, and a first intermediate knuckle, and
wherein the intermediate knuckle is offset from the first and second end knuckles to form a corner between the first end knuckle and the second end knuckle.

\* \* \* \* \*